United States Patent Office 2,927,047
Patented Mar. 1, 1960

2,927,047

PROCESS OF APPLYING A COATING OF AN ATACTIC POLYMER OF POLYPROPYLENE TO A POLYETHYLENE OR POLYPROPYLENE SURFACE

Felix Schülde, Bad Soden (Taunus), and Werner Sommer and Dietrich Schleede, Frankfurt am Main, Germany, assignors to Farbwerke Hoechst Aktiengesellschaft vormals Meister Lucius & Bruning, Frankfurt am Main, Germany, a corporation of Germany No Drawing. Application November 13, 1957
Serial No. 696,060

Claims priority, application Germany November 16, 1956

19 Claims. (Cl. 117—138.8)

The present invention relates to a process for applying well adhesive coatings to objects of polymers of olefins.

It is known that finished products of polyolefins, such as polyethylene and polypropylene or copolymers thereof, are difficult to print, lacquer or coat so as to be resistant to scratching and abrasion or in a manner such that the film which has been formed adheres firmly to the support. Adhesives suitable for bonding these polymers have not hitherto been known, either. Prior to the application of the aforesaid coatings the surfaces of the polymers have therefore been pretreated in various ways, for example by surface oxidation by means of photochemical action of chlorine, by flaming the surface while simultaneously cooling the back, by treatment with electron beams or gamma rays or by exposure to the action of ozone.

Endeavors to dispense with this troublesome surface treatment suffered chiefly from the difficulty that the surface of the polyolefins could not hitherto be swollen at room temperature so that the substances applied to the surface did not adhere well.

Now we have found that well adhesive coatings can be obtained on the surfaces of polyolefins by applying solutions of atactic polypropylene or atactic copolymers of propylene and ethylene to the polyolefin surface and converting the solutions in known manner into the solid state. Atactic or amorphous polymers of propylene are described, for example, by G. Natta in "Makromolekulare Chemie," volume 16, 1955, pages 213 to 237. The coatings of the invention may be used for coating procedures (lacquers, printing inks) as well as for the bonding of polymers. The molecular weight of the amorphous homopolymers of propylene to be added according to the present invention is within the order of 50,000 to about 1,500,000. The atactic copolymers of propylene and ethylene contain, for example, 10 to 90% of propylene and preferably 10 to 30% of propylene base molecules incorporated by polymerization.

The process of the invention is advantageously applied to low pressure polyolefins as they are described, for example, by Raff-Allison in "Polyethylene" on page 72 et seq. (Zeigler-Polyolefins etc.).

As solvents there are advantageously used those which slightly swell the surface of the polyolefin. In this manner an especially good adhesion is obtained. Suitable solvents are, for example, aliphatic hydrocarbons such as ligroine and petroleum ether, chlorinated hydrocarbons such as chloroform, carbon tetrachloride, dichlorethylene, trichlorethylene, chlorobenzene and the like, aromatic and cycloaliphatic hydrocarbons such as benzene, tetrahydronaphthalene, decahydronaphthalene and unsaturated hydrocarbons such as styrene, vinyl acetate and the like.

The solutions of the invention may be arranged in two classes according to the solvent used. There may either be employed solutions from which the solvent must be evaporated in order to harden the coating or solutions which permit of hardening the solvent together with the dissolved substance. In the first case the usual organic solvents are used, preferably those capable of swelling the polymer to be coated. In the second case unsaturated, polymerizable monomeric compounds such as styrene, vinyl acetate and the like may be used.

Before being applied to the polymer surface, the solutions of the second type containing polymerizable solvents are admixed, depending on the mode of application, with a cold setting or thermo-setting catalyst system, for example with the cold-setting system cyclohexanone peroxide/Co-naphthenate or benzoylperoxide/dimethylaniline or with thermo-setting catalysts such as benzoylperoxide, tertiary butyl perbenzoate and the like. The last-mentioned group of solutions offers the advantage that the solvent need not be evaporated and thicker coatings may consequently be applied. These solutions may also be advantageously used for the bonding of olefin polymers since the solvent has no detrimental effect upon the strength of the bonded parts, contrary to other solvents which must first diffuse away through the bonded polymer. Another great advantage is the fact that such coatings can be completely hardened in the cold in known manner within a short time. Moreover, suction installations for solvent vapors may be dispensed with, which constitutes a great advance in industry.

The concentration of amorphous polymer in the solution should not, advantageously, exceed 30% by weight. The concentration always depends on the mode of applying the solution to the surface of the polymer. For example, a solution which is to be applied by means for a spray gun should have a lower viscosity than a solution to be applied by means of a printing roller.

Before dissolving the amorphous polymer, the known organic or inorganic dyestuffs or pigments to be used for printing or lacquering are incorporated into the amorphous polymer by rolling. It is also possible to admix the dyestuffs, pigments or fillers subsequently with the solution and to distribute them uniformly by grinding, for example, on a known roller mill.

By incorporating soluble dyestuffs into the finished solution there are obtained varnishes and printing inks of the kind of the known inscription inks. Compared with these known inks, the products of the invention have the advantage that the viscosity can be adjusted and the products are therefore well workable. When the products of the invention are used for lacquering or coating foils or sheets, the color and design of the coating are equally well visible on both sides of the foils or sheets and are thus equivalent on both sides.

The solutions of amorphous polypropylene according to the invention may be combined with known lacquer raw materials, such as epoxide resins, polyester resins, ketone resins, chlorinated diphenyls and the like in order to improve the properties of the films obtained with said solutions on polyolefins.

The atactic polyolefins or their solutions are equally well suitable for use as lacquers or priming substances for nail resistant lacquers which are fast to scratching and abrasion, as bonding agents for the printing of foils and as adhesives. They may also be used for the preparation of primings to which a usual adhesive is applied later on.

The following examples serve to illustrate the invention but they are not intended to limit it thereto.

*Example 1*

Amorphous polypropylene of a reduced viscosity

η Red. of 0.8 into which 10% of an organic red pigment such as perylene-1,12,6,7-tetracarboxylic acid-di(3',5'-dimethylphenyl)-imide of the following formula

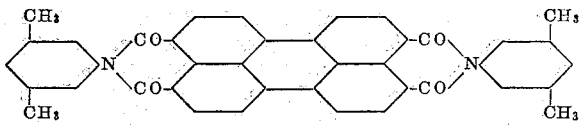

had been incorporated by rolling, was dissolved in petroleum ether. The solution was diluted to a solid content of about 5%, in order to obtain a solution capable of being sprayed.

The solution so obtained was applied as a thin priming layer to a sheet of low pressure polyethylene having a thickness of about 1 mm. On the dried priming a hard clear varnish prepared, for example, on the basis of chlorinated caoutchouc was sprayed. In this manner the coating that had been applied first was rendered extremely resistant to scratching. A thermal after-treatment of the priming was not necessary. The resulting coating was resistant to scratching and abrasion and adhered firmly to the support.

*Example 2*

The solution described in Example 1 was applied to a sheet of isotactic polypropylene, while proceeding under the same conditions as described in Example 1. The resulting coating was resistant to scratching and abrasion and adhered firmly to the support.

*Example 3*

Amorphous polypropylene of η Red. 1.2 was dissolved in styrene. A 20% solution was prepared into which 5% of an organic yellow pigment such as the disazo dyestuff obtained from tetrazotized 3.3'-dichlorobenzidine and 2 mols of 1-aceto-acetylamino-2,5-dimethoxy-4-chlorobenzene and 2% of $TiO_2$ were subsequently incorporated by grinding on a roller mill and the resulting lacquer was admixed with 2% of benzoylperoxide. Shortly before being used, the mixture was admixed with 0.4% of dimethylaniline.

The resulting solution was used (a) For lacquering a pressed sheet of high pressure polyethylene. The lacquer hardened completely within about 15 minutes at room temperature.

By heating to a temperature of 120 to 140° C. the hardening time could be reduced to about 2 to 3 minutes in another experiment.

Both the lacquer coat that had been hardened in the cold and the lacquer coat subjected to the thermal hardening were resistant to scratching and abrasion and adhered firmly to the support, (b) For writing on a bottle of low pressure polyethylene. The inscription was hardened as described sub item (a) and was resistant to scratching and abrasion and adhered firmly to the support.

(c) For printing a blown film of low pressure polypropylene. The print was hardened as described sub item (a) and was resistant to scratching and abrasion and adhered firmly to the support.

(d) For printing an extruded sheet (wide slit die) of an ethylene-propylene copolymer containing 8% of methyl groups. The print was hardened as described sub item (a) and was resistant to scratching and abrasion and adhered firmly to the support.

*Example 4*

In one case an amorphous copolymer of ethylene and propylene containing 10% of methyl groups and having a value of η Red. of 1.5, and in another case amorphous polypropylene of η Red. 1.5 were dissolved in styrene. 20% solutions were prepared which were admixed with 2% of benzoylperoxide and dyed with 0.5% of a soluble organic blue dyestuff. To facilitate work the solutions were diluted to a solid content of 5% with petroleum ether.

With these solutions were printed in turn foils 0.5 millimeter thick prepared of high pressure polyethylene, low pressure polyethylene, low pressure polypropylene and a copolymer of ethylene and propylene containing 15% of methyl groups. The printed foils were annealed for a short time at 120° C.

The resulting prints were resistant to scratching and abrasion and adhered firmly to the support.

Both the design and the color of the prints were equally well visible on both sides of the foils.

*Example 5*

Socket pipes of polyethylene 2.5 centimeters in diameter were roughened at the overlapping parts with sandpaper and coated with a 10% solution of amorphous polypropylene in monostyrene containing 2% of methylethylketone peroxide and $\frac{1}{10,000}$ part of Co in the form of Co-naphthenate. The film was polymerized for about 20 minutes at 20° C. and the pipes were then bonded by means of a mixture of epoxide resin and a hardener. The epoxide resin used possessed an epoxide equivalent of 175 to 185 and a viscosity of 10,000 cp. at 20° C. As hardener diethylenetriamine was used. Prior to the tension test, the bonded pipe was completely hardened for 1 hour at 100° C. The tearing load of the bonded pipe was 400 kg. at an overlap length of 30 millimeters.

*Example 6*

A blown film of polypropylene was bonded with a 20% solution of amorphous polypropylene in monostyrene containing 4% of methylethylketone peroxide and $\frac{1}{10,000}$ part of Co in the form of Co-naphthenate. The bonding was carried out at 20° C. The properties of the bonded parts were excellent.

*Example 7*

A solution of amorphous polypropylene obtained according to the following prescription:

12 parts by weight of amorphous polypropylene
6 parts by weight of epoxide resin
60 parts by weight of xylene
20 parts by weight of methylethylketone
2 parts by weight of meta-phenylene diamine and containing an epoxide resin was admixed with an organic pigment, ground and tested as a printing ink for polyethylene foils.

The print adhered well to a polyethylene foil which had not been pretreated. The adhesive power was still improved by a thermal after-treatment.

We claim:

1. In a process for the production of an adherent coating on a polymeric surface prepared from a polymer selected from the group consisting of polyethylene, polypropylene, and an ethylene-propylene copolymer, the steps of applying a solution of an atactic polymer of propylene as a binding agent to said surface and subsequently solidifying said solution on said surface.

2. Process of claim 1 wherein the binding agent is dissolved in an aliphatic solvent.

3. Process of claim 1 wherein the binding agent is dissolved in a chlorinated organic solvent.

4. Process of claim 1 wherein the binding agent is dissolved in a cyclic organic solvent.

5. Process of claim 1 wherein the binding agent is an atactic polypropylene.

6. Process of claim 1 wherein the binding agent is an atactic propylene-ethylene copolymer.

7. Process of claim 1 wherein the solution of binding agent contains an epoxide resin.

8. Process of claim 1 wherein the solution of binding agent contains a polyester resin.

9. Process of claim 1 wherein the solution of binding agent contains a member selected from the group consisting of an inorganic dyestuff and an organic dyestuff.

10. Process of claim 1 wherein the solution of binding agent contains a filler.

11. In a process for the production of an adherent coating on a polymeric surface prepared from a polymer selected from the group consisting of polyethylene, polypropylene, and an ethylene-propylene copolymer, the steps of applying a solution of an atactic polymer of propylene as a binding agent to said surface and subsequently solidifying said solution on said surface, the solvent for said atactic polymer being an unsaturated polymerizable compound which need not be evaporated from the coating layer during solidification thereof.

12. Process of claim 11 wherein a polymerizable catalyst is included in said solution of atactic polymer.

13. Process of claim 12 wherein said catalyst is an organic peroxide and solidification is effected by polymerization of said solvent with heating.

14. Process of claim 12 wherein said polymerization catalyst is a mixture of an organic peroxide and cobalt naphthenate and solidification is effected by the polymerization of said solution in the cold.

15. In the process for preparing a layer of good adhesiveness on a sheet of low-pressure polyethylene, the step which comprises admixing amorphous polypropylene with an organic pigment consisting of perylene-1,12,6,7-tetra-carboxylic acid-di-(3',5'-dimethylphenyl)-imide of the following formula

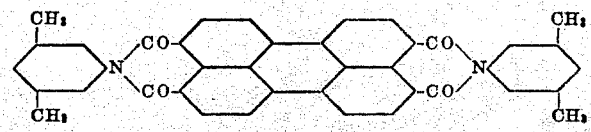

dissolving this mixture in petroleum ether, coating the polyethylene sheet with said solution, and subsequently drying the solution on the surface of the polyethylene sheet.

16. In the process for preparing a layer of good adhesiveness on a sheet of a copolymer from ethylene and propylene the step which comprises coating the sheet with a solution of an amorphous polypropylene in styrene which solution is admixed with 5% of an organic yellow pigment obtained from tetrazotized 3,3'-dichlorobenzidine and 2 moles of 1-aceto-acetylamino-2,5-dimethoxy-4-chlorobenzene; 2% of $TiO_2$, 2% of benzoyl peroxide, and 0.4% of dimethyl aniline, and subsequently drying the solution on the sheet at room temperature.

17. In the process for preparing a layer of good adhesiveness on a sheet of high pressure polyethylene the step which comprises coating the sheet with a solution of an amorphous ethylene-propylene copolymer in styrene which solution is admixed with 2% of benzoyl peroxide and 0.5% of a soluble organic blue dyestuff, diluting said solution with petroleum ether, coating the high pressure polyethylene sheet with the solution, and heating the sheet at 120° C.

18. In the process for preparing a layer of good adhesiveness on a sheet of polypropylene, the step which comprises coating the polypropylene sheet with a solution of amorphous polypropylene in styrene, said solution containing also 4% of methylethylketone peroxide and $1/10000$ part of cobalt in the form of cobalt-naphthenate calculated on the reaction mixture, and subsequently drying said solution on the sheet at room temperature.

19. In the process for preparing a layer of good adhesiveness on a sheet of untreated polyethylene, the step which comprises admixing a solution of an amorphous polypropylene and an epoxide resin in a mixture of xylene and methylethylketone, said solution also containing 2% by weight of m-phenylene diamine, calculated on the solution, with an organic pigment, coating the polyethylene sheet with said solution, and subsequently drying the solution on the polyethylene sheet.

References Cited in the file of this patent

UNITED STATES PATENTS

| 2,689,197 | Gerlich | Sept. 14, 1954 |

FOREIGN PATENTS

| 529,688 | Canada | Aug. 28, 1956 |
| 538,782 | Belgium | Dec. 6, 1955 |

Notice of Adverse Decision in Interference

In Interference No. 91,692 involving Patent No. 2,927,047, F. Schülde, W. Sommer and D. Schleede, PROCESS OF APPLYING A COATING OF AN ATACTIC POLYMER OF POLYPROPYLENE TO A POLYETHYLENE OR POLYPROPYLENE SURFACE, final judgment adverse to the patentees was rendered Dec. 23, 1964, as to claims 1, 3 and 5.

[*Official Gazette May 18, 1965.*]